(12) United States Patent
Kumar et al.

(10) Patent No.: US 7,773,626 B2
(45) Date of Patent: Aug. 10, 2010

(54) TECHNIQUE TO IMPROVE NETWORK SWITCH THROUGHPUT

(75) Inventors: Amit Kumar, Princeton, NJ (US); Partha Kundu, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 843 days.

(21) Appl. No.: 11/559,793

(22) Filed: Nov. 14, 2006

(65) Prior Publication Data

US 2008/0112432 A1    May 15, 2008

(51) Int. Cl.
*H04J 3/02*    (2006.01)

(52) U.S. Cl. ....................................... 370/462

(58) Field of Classification Search .................. 370/462, 370/465, 443, 444, 445, 461, 447, 437, 395.4, 370/395.42, 395.2, 411, 413, 352, 401; 710/317
See application file for complete search history.

(56) References Cited

U.S. PATENT DOCUMENTS

| | | | |
|---|---|---|---|
| 5,485,586 A * | 1/1996 | Brash et al. | 710/112 |
| 6,594,782 B1 * | 7/2003 | Tagawa | 714/30 |
| 7,051,195 B2 * | 5/2006 | Gaither et al. | 712/235 |
| 7,484,242 B2 * | 1/2009 | Aggarwal et al. | 726/7 |

\* cited by examiner

*Primary Examiner*—Chi H Pham
*Assistant Examiner*—Alexander Boakye
(74) *Attorney, Agent, or Firm*—Trop, Pruner & Hu, P.C.

(57) ABSTRACT

A technique to route data according to a speculative priority. At least one embodiment detects a conflict among a number of data received by the router, assigns a speculative priority to one of the data in a first clock portion and sends the speculatively prioritized data to a receiving agent in a subsequent clock portion.

28 Claims, 6 Drawing Sheets

TECHNIQUE TO IMPROVE NETWORK SWITCH THROUGHPUT

BACKGROUND

1. Field

The present disclosure pertains to the field of computing and computing networks, and, more specifically, to the field of allocating information within a network switch or array of network switches.

2. Background

Networks of microprocessors, processor cores, or computers must often deal with the allocation of information among a number of sending and receiving processors, cores, or computers (referred to herein collectively as "agents" or "processing elements"). In some networks, a device or circuit, such as a router, may be used to allocate or direct information among a number of agents.

Figure 1:
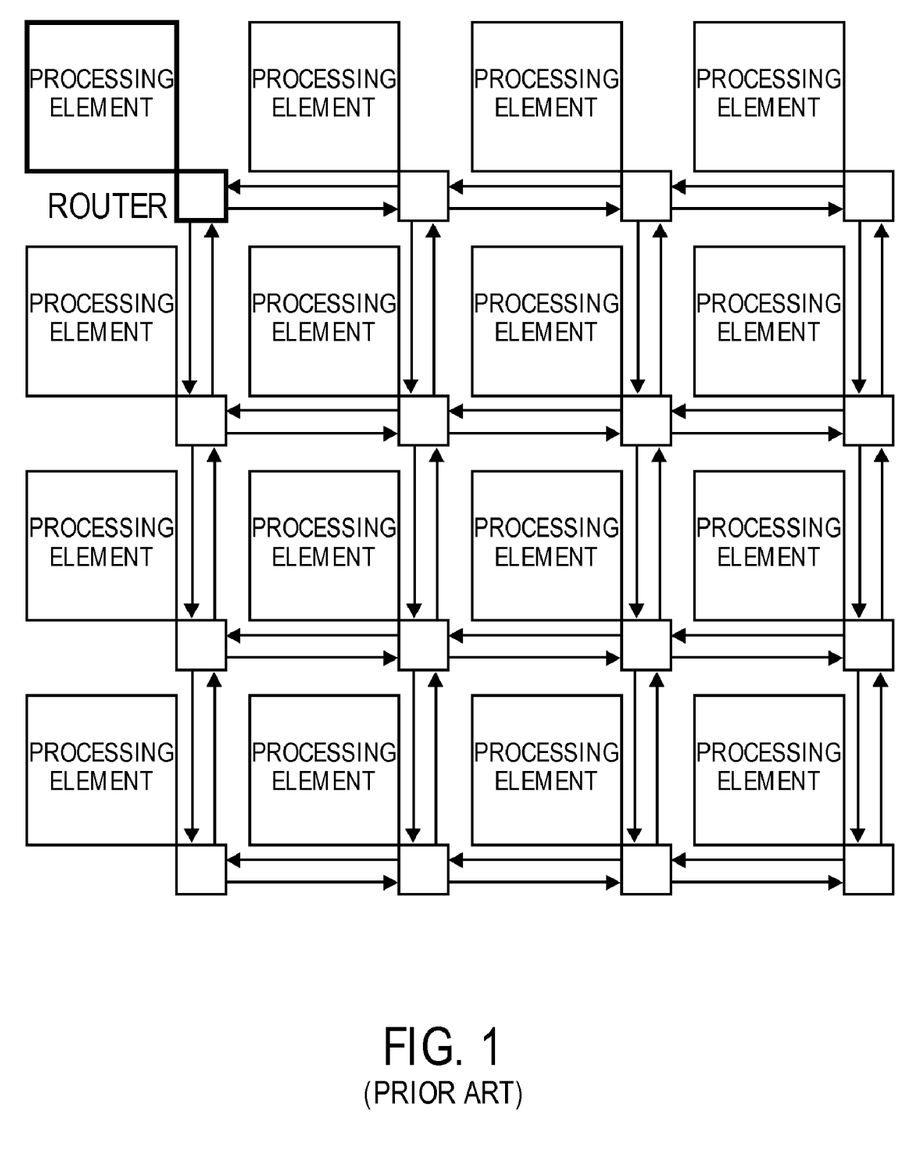
FIG. 1 illustrates a network of computing agents that communicate through a network of routing devices.

FIG. 1, for example, illustrates an array of agents that communicate with each other through a number of routers interconnecting the agents to each other. Although the array of agents illustrated in FIG. 1 each have a router associated therewith, in other array of agents, a router may be associated with more than one agent, such that the agents share a particular router. As mentioned above, the array illustrated in FIG. 1 may include processors, processor cores, computer systems, or some combination of these.

Figure 2:
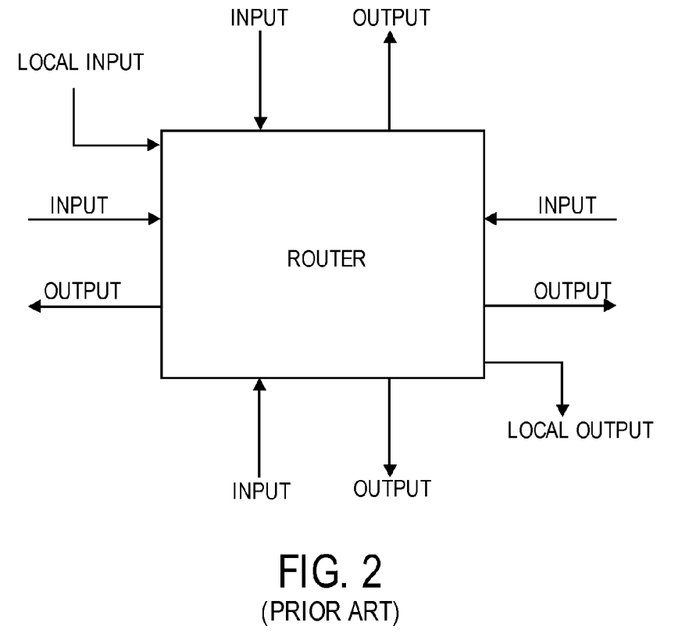
FIG. 2 illustrates a block diagram of a router using a prior art routing technique.

One challenge associated with an array of agents, such as the one illustrated in FIG. 1, may be the efficient allocation of information among the various agents. Efficient information routing may be further obscured if a router must route a number of inputs from one or more agents to a number of outputs in order to deliver information to one or more agents. FIG. 2, for example, illustrates a router that has five inputs and five outputs—four inputs and outputs for information from and to adjacent agents and one input and output for local information to be injected into the network and routed to agents within the network. Some prior art routers may have fewer or more inputs and outputs than those illustrated in FIG. 2.

One problem associated with routing information among a network of agents, such as the one illustrated in FIG. 1, via a router, such as the one illustrated in FIG. 2, is the efficient handling of conflicts that may arise among inputs and outputs of the router. Conflicts may result if the capacity of a switch or router is exceeded, reducing the ability of the switch/router to handle multiple streams of data concurrently. For example, a conflict may occur if data stream from an input port is to be sent to a number of different outputs at the same time.

Some information routing techniques address conflicts, such as the one described above, by merely choosing one of the outputs to accept the data and preventing the data to be sent to the other outputs, thereby requiring the data to be resubmitted by the sending agent. In some prior art routing techniques, the input data may not retain its priority after it has been denied access to an output and therefore must wait for other data on other inputs to be routed. This may result in reduced data throughput through the router and the network in general.

BRIEF DESCRIPTION OF THE FIGURES

The present invention is illustrated by way of example and not limitation in the accompanying figures.

DETAILED DESCRIPTION

Embodiments of the invention relate to processors and computer systems. More particularly, at least one embodiment of the invention relates to a technique to efficiently route information through a network switch or array of network switches.

Embodiments of the invention may be used to route information among a number of agents, including processors, processor cores, computers, or other circuits or devices, including a combination of any of these. In some embodiment, information to be communicated from a sending agent to a recipient agent is sent through a routing device, such as an integrated circuit routing device or a computer network router (generically referred to herein as a "router"). In some cases, the router may be an integral part of the sender or receiving agent or some other device within the network.

Because a router may be used to route a number of input data from one or more sending agents to one or more receiving agents, conflicts between router input and output resources may arise. For example, if data is to be routed from a router input port to a number of different router output ports in order to deliver the data to a number of different receiving agents, a conflict may arise as to which output the data will be sent to first, second, third, and so forth, depending on the number of outputs to which the data is to be routed.

In some embodiments, this type of conflict is addressed by allowing the data (or some signal, bits, etc., associated therewith) to request access to a number of different outputs in parallel (rather than sequentially, for example) so as to help minimize the delay in routing data. In the case that data is being requested to be sent to multiple outputs of the router, the router may grant the data access to an output sequentially until the data has been granted access to each output requested. In one embodiment, a priority level is assigned to the output requests and the data is granted access to the outputs in the order of their priority. In one embodiment, the priority levels of the conflicting output requests are such that requests from other inputs will not be granted an output before the data generating the conflict has been granted access to each output requested, thereby avoiding compounded conflicts.

In one embodiment, data is routed in cycles determined by a synchronous clock signal within the router. For example, in a first cycle, conflicting output requests may be assigned a priority level and the highest priority request is granted access to an output first. In subsequent cycles, the other output requests are granted access to an output in order of their priority, one cycle at a time, until all of the conflicting output requests have been granted access to their requested outputs.

Figure 3A:
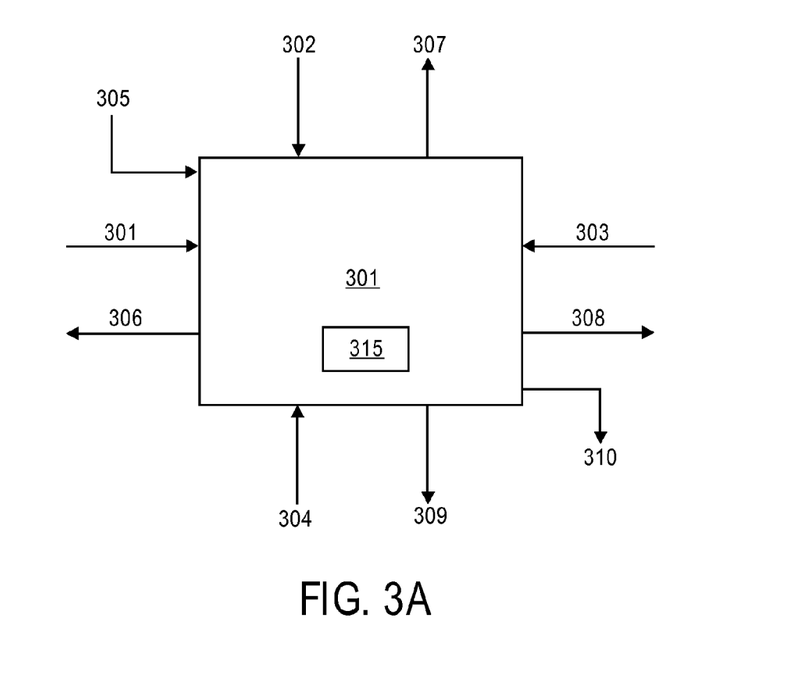
FIG. 3 illustrates a router in which various aspects of at least one embodiment of the invention may be used.

FIG. 3a illustrates a router in which at least one embodiment of the invention may be used. Particularly, FIG. 3a illustrates a router having four inputs 301-304 corresponding to four different sending agents and one input 305 corresponding to locally injected data. Furthermore, the router of FIG. 3a includes 4 outputs 306-309 corresponding to four different receiving agents and one output 310 corresponding to a locally received data. In other embodiments, the router may have fewer or more inputs and/or outputs. In one embodiment, router 300 includes logic 315 used to implement one or more embodiments of the invention. In some embodiments, the logic 315 is composed of CMOS circuits ("hardware"), whereas in other embodiments, the logic 315 is composed of instructions executable by a processor ("software"). In other embodiments, the logic 315 may be a combination of hardware and software.

In one embodiment, data may be input on one or more of the input lines of the router of FIG. 3a. In one embodiment, if a number of requests from an input to one or more outputs are within the bandwidth of what the router or switch can handle, then no conflict may exist among the requests. However, if a number of requests from an input for access to one or more outputs are made, above that which can be handled by the router or switch, then a conflict may exist as to the order in which data is to be sent to the requested output port(s). In one embodiment, the conflict may be resolved or avoided by allowing the output requests to be made in parallel, assigning a priority to each request and then if a conflict is detected, forcing these requests to be serviced in the order prescribed by their respective priority assignment. In one embodiment, each request may be serviced sequentially, according to their priority, over several clock phases, cycles, or other portions of a clock signal. Furthermore, in one embodiment, the priority of the requests are assigned such that no other requests from other inputs may be granted before the conflicting ones, such that the conflict is resolved before the conflicted outputs are allowed access by other data.

In other embodiments, other requests may be granted after a certain priority of conflicting requests are granted. For example, after the second priority request has been granted, other requests, besides the conflicted requests, may be granted. In other embodiments lower priority requests may be granted before other non-conflicting requests may be granted.

Figure 3B:
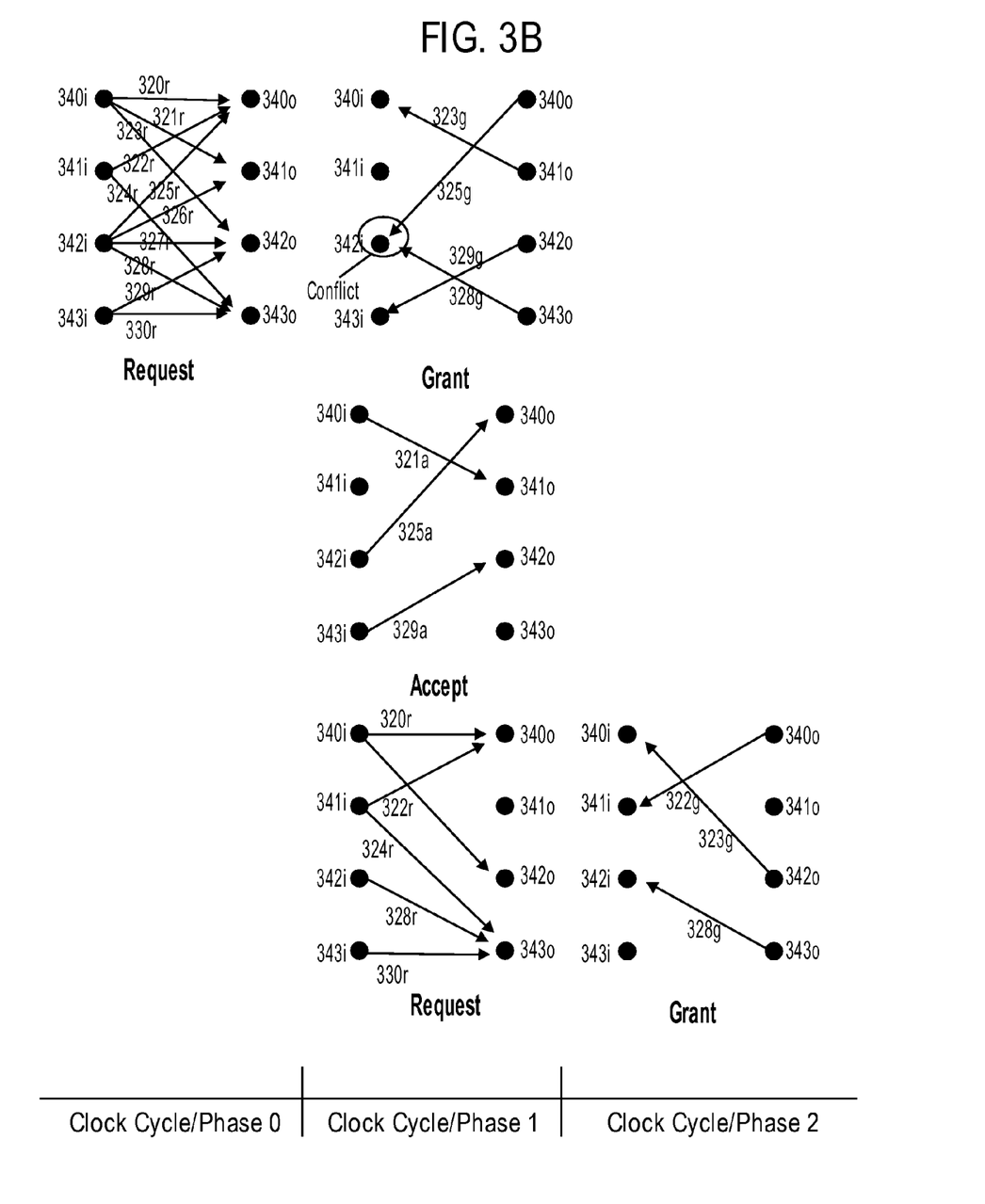

FIG. 3b illustrates some of the techniques that may be used in one embodiment of the invention. Particularly, FIG. 3b illustrates that in a first clock cycle or phase, a number of requests 320r-330r from a number of inputs (illustrated by nodes 340i-343i) for a number of outputs (illustrated by nodes 340o-343o). In one embodiment, in the subsequent clock or phase a number of grant signals 323g, 325g, 328g, and 329g are generated from outputs 340o-343o indicating to inputs 340i, 343i, and 342i, respectively, which of the corresponding requests may be sent to the corresponding outputs.

Illustrated in FIG. 3b, grants of requests from the same input may produce a conflict. In FIG. 3b, outputs 340o and 343o are selected to receive requests 325r and 328r, respectively. The conflict illustrated in FIG. 3b arises, because, in one embodiment, data may only be sent to one output at a time from a particular input. In one embodiment, a priority is applied to each request in parallel with the requests being granted. Therefore, when the conflict illustrated in FIG. 3b is encountered, a router in which the technique illustrated in FIG. 3b is used, may resolve the conflict and transmit a single request of data from the conflicted input in the next cycle or phase.

In one embodiment, data requests are allowed to access output ports according to protocol. For example, FIG. 3B illustrates that when making the request in clock cycle/phase 1, input port 342i prioritizes request 325r higher than request 328r. Therefore, in the next cycle/phase when 342i is indeed notified of a conflict between 325g and 328g, request 325 is selected (shown as the accept phase in clock cycle/phase 1 of FIG. 3b). Concurrently, when preparing the next set of requests to be sent out, input 342i all other input requests may be suppressed that may be pending to various output ports (e.g. 326 and 327 and other that may have arrived in that cycle/phase), favoring the request that had previously conflicted (e.g., request 328r). Furthermore, in the following grant phase (clock cycle/phase 2) output port 343o, although receiving other requests—330 and 324—is obliged to grant request 328 regardless of its current arbitration priority.

Figure 4:
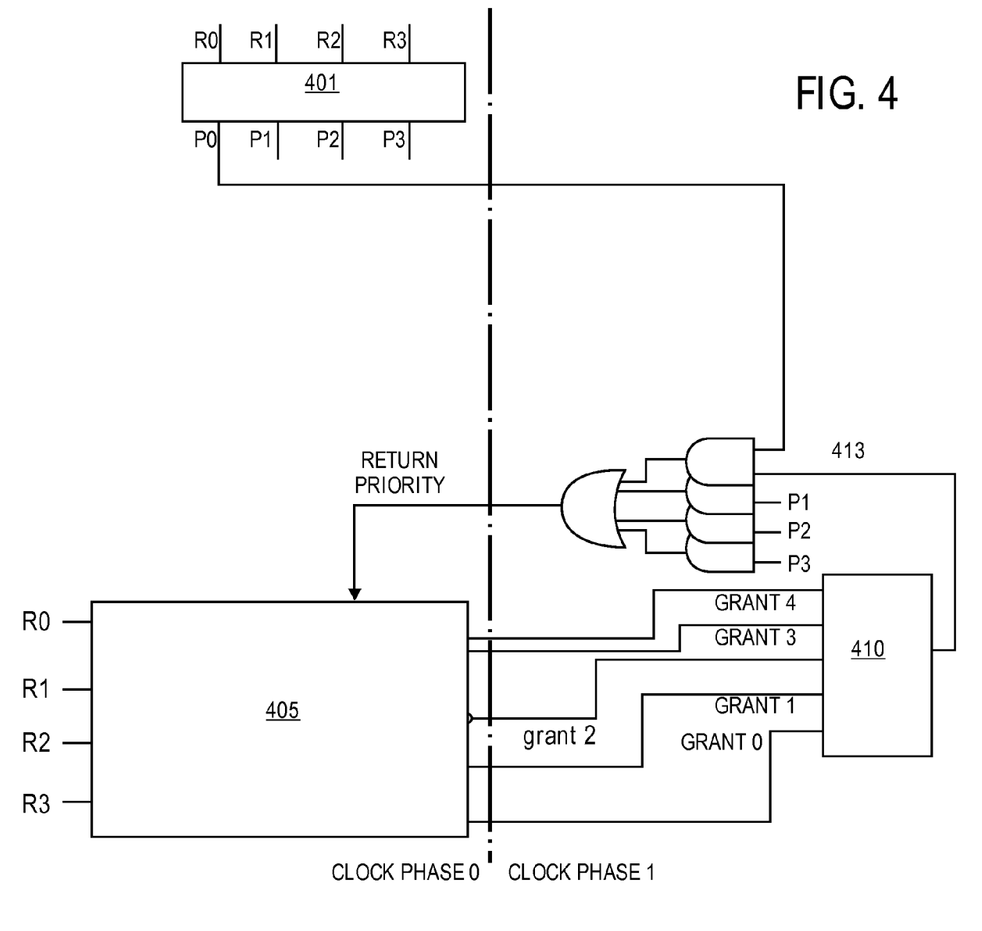
FIG. 4 illustrates logic that may be used to perform a routing technique, according to one embodiment of the invention.

FIG. 4 illustrates various logic that may be used to implement at least one aspect of one embodiment of the invention. In one embodiment, a first clock cycle (or first clock phase of the first clock cycle), a number of requests R0 through R3, each corresponding to a request from input port 0 through 3 is received by the grant logic 405 for each output port. In parallel (in clock phase 0 as shown in FIG. 4) a speculative priority encoder 401 speculatively assigns a priority level to each of the requests R0 through R3.

In subsequent clock cycle or clock phase, conflict logic 410 detects whether multiple requests from an input have been granted by grant logic 405. If multiple requests have indeed been granted, then conflict logic 410 generates a signal 413 to enable the priority assigned by priority encoder 401 to guide the selection of requests to be routed from the input to the output, in the following and subsequent clocks, as applicable. In one embodiment, the priority of the requests are assigned according to a table, logic, static assignment, etc.

In one embodiment, the requests that were found to have conflicted at an input port (e.g. 325r and 328r in FIG. 3B) are allowed access to their corresponding requested output ports in subsequent cycles or phases by logic 405. In some embodiments logic 405 prioritizes each of the previously conflicting request over new requests that may be sent from the other input ports. In other embodiments, other logic may be used to implement one or more functions represented in FIG. 4. Furthermore, although some aspects of the logic illustrated in FIG. 4 are implemented in hardware, in other embodiments, one or more features illustrated in FIG. 4 may be implemented in software or some combination of software and hardware. Although in one embodiment, there are 4 inputs and 4 outputs and the speculative priority encoder encodes priority for four requests, in other embodiments any number of inputs, outputs, and priority assignments may be made.

Figure 5:
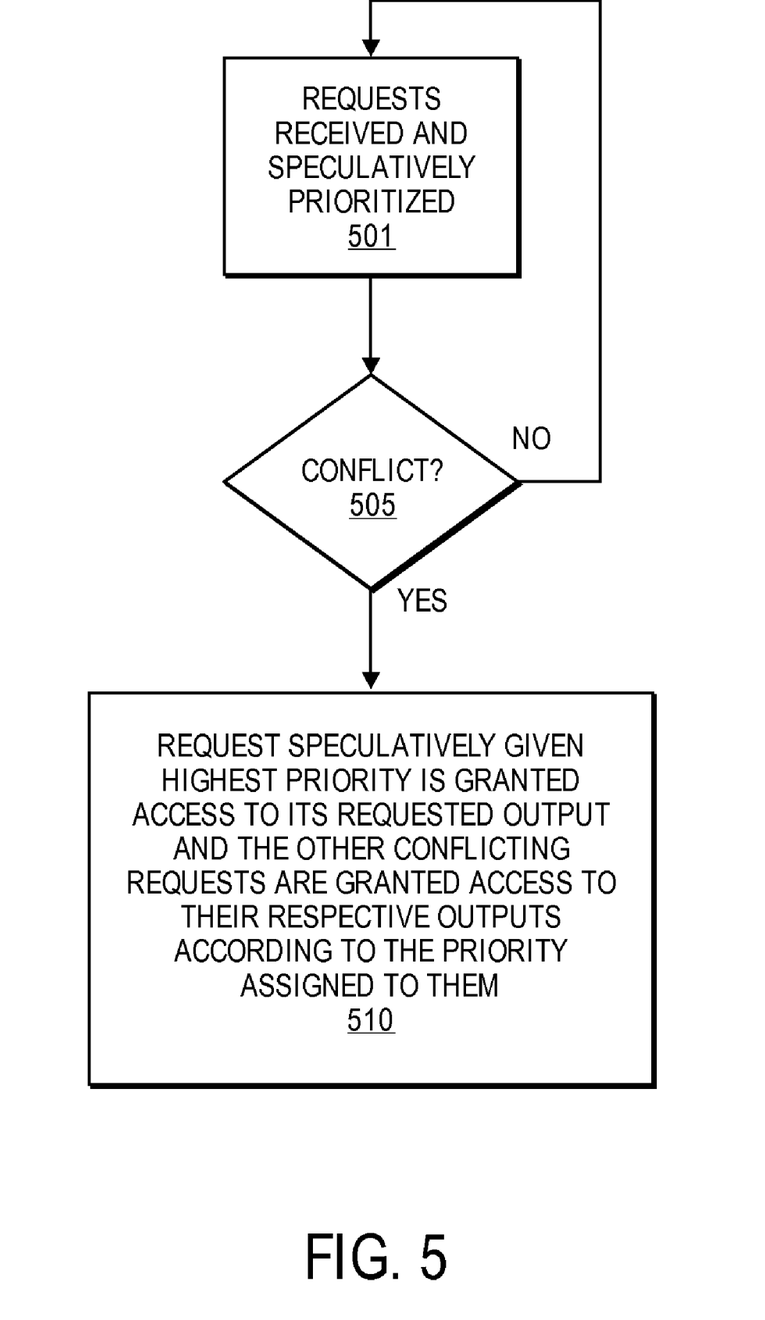
FIG. 5 is a flow diagram illustrating operations that may be used in performing a routing technique, according to one embodiment of the invention.

FIG. 5 is a flow chart illustrating operations that may be used to perform at least some aspects of at least one embodiment of the invention. Referring to FIG. 5, at operation 501, a number of requests for a number of outputs are received and speculatively prioritized. At operation 505, if a number of different outputs are being requested by a number of requests received on the same input, the request speculatively given highest priority is granted access to its requested output and the other conflicting requests are granted access to their respective outputs in subsequent cycles or phases, according to the priority assigned to them at operation 510. In one embodiment the functions performed at operation 501 are performed in a first clock cycle or phase and the functions performed at operation 505 are performed in the next clock cycle or phase.

In one embodiment, the conflicting requests come from a common input to a router, each requesting access to different outputs to transfer their corresponding data from agent to agent.

Figure 6:
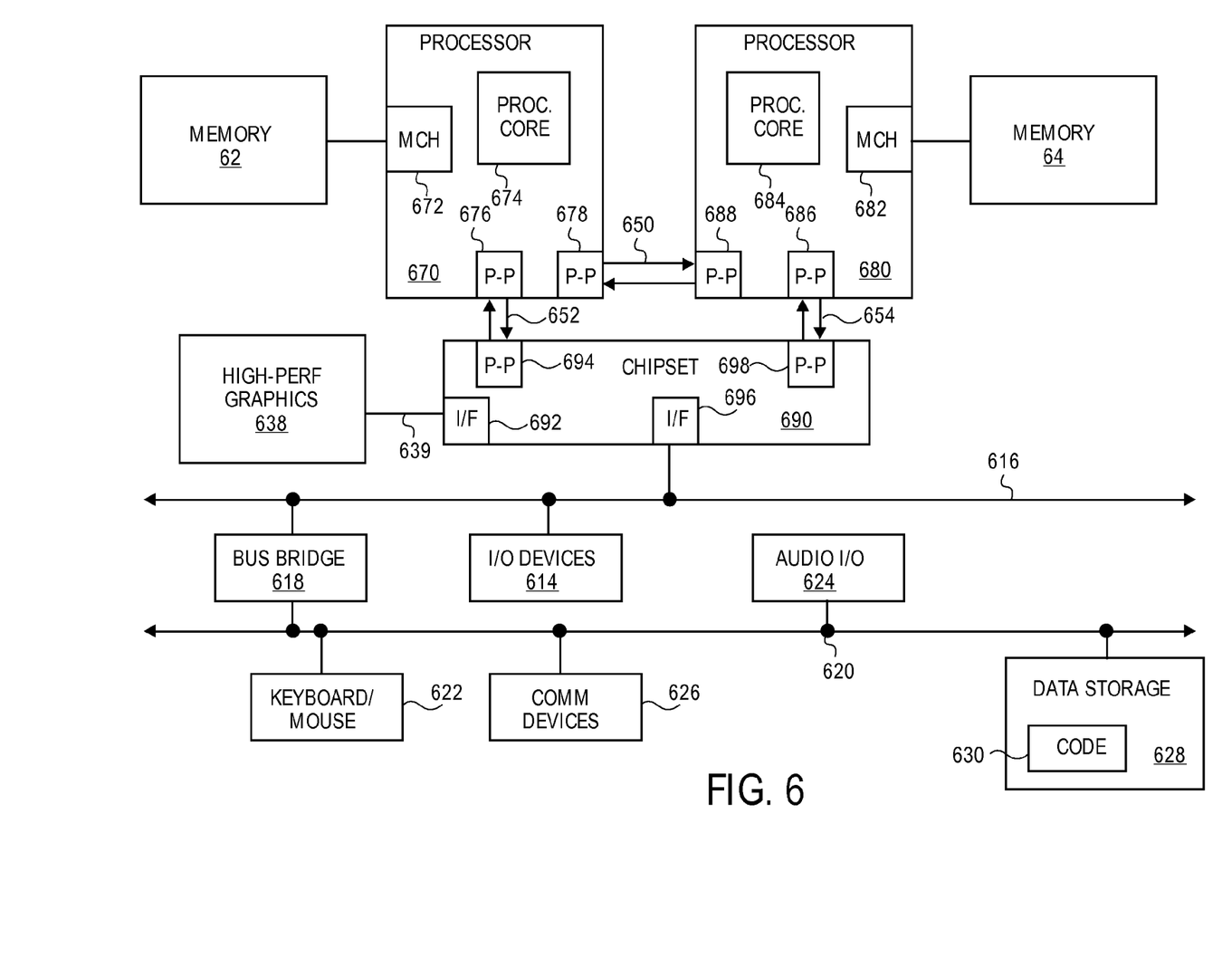
FIG. 6 illustrates a network of computing elements coupled via a point-to-point interconnect.

FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. An apparatus comprising:
   a speculative priority encoder (SPE) to assign a speculative priority to a first of a plurality of output requests during a first portion of a clock signal coupled to the SPE;
   a conflict detection unit to enable the first of the plurality of output requests to have access to a requested output during a subsequent portion of the clock signal.

2. The apparatus of claim 1, wherein the first portion of the clock signal represents a first phase of the clock signal and the subsequent portion of the clock signal represents a second phase of the clock signal.

3. The apparatus of claim 1, wherein the first portion of the clock signal represents a first cycle of the clock signal and the subsequent portion of the clock signal represents a second cycle of the clock signal.

4. The apparatus of claim 1, wherein output requests other than the first of the plurality of output requests are to be granted access to requested outputs during portions of the clock signal subsequent to the subsequent portion.

5. The apparatus of claim 4, wherein the other output requests are to be granted according to the speculative priority assigned to them during the first portion of the clock signal.

6. The apparatus of claim 5, wherein the plurality of output requests are to be granted before different output requests are granted.

7. The apparatus of claim 6, wherein the plurality of output requests are to be presented on a common input to access a plurality of different outputs.

8. The apparatus of claim 7, comprising a data router.

9. A system comprising:
   a sending agent to send a plurality of data to a receiving agent;
   a router to speculatively prioritize a plurality of output requests corresponding to the plurality of data during a first clock cycle and to grant the output requests corresponding to the plurality of data in subsequent clock cycles according to the speculative priority assigned to them during the first clock cycle.

10. The system of claim 9, wherein the router is to prevent one or more other output requests from being granted until the plurality of output requests have been granted.

11. The system of claim 10, wherein the router includes a plurality of inputs coupled to a plurality of sending agents and a plurality of outputs coupled to a plurality of receiving agents.

12. The system of claim 11, wherein the plurality of output requests are to be presented to the router on a first input of the plurality of inputs.

13. The system of claim 11, wherein the plurality of output requests are to be presented to the router on more than one of the plurality of inputs.

14. The system of claim 12, wherein each of the plurality of output requests are to be transmitted from the router via a different one of the plurality of outputs.

15. The system of claim 13, wherein each of the plurality of output requests are to be transmitted from the router via a different one of the plurality of outputs.

16. A method comprising:
   detecting a conflict between a plurality of input data received in a router associated with at least one agent of a network and a corresponding number of outputs of the router;
   speculatively assigning, by the router, a priority to the plurality of input data and granting a highest priority input data access to one of the corresponding number of outputs in a first clock cycle.

17. The method of claim 16 further comprising granting, by the router, lower priority input data access to the remainder of the corresponding number of outputs in subsequent clock cycles.

18. The method of claim 17, wherein the plurality of input data are all granted access to their corresponding outputs before any other input data is granted access to the corresponding outputs.

19. The method of claim 16, further comprising sending the plurality of input data to a plurality of receiving agents in sequential clock cycles.

20. The method of claim 19, wherein the plurality of input data is sent to the plurality of receiving agents via the router.

21. A processor comprising:
   a plurality of processing cores;
   a router to receive a plurality of conflicting data on an input from at least one of the plurality of processing cores and to send the plurality of conflicting data to corresponding ones of the plurality of processing cores, each in sequential clock cycles before other data are to be sent to the corresponding ones of the plurality of processing cores, wherein a speculative priority is to be assigned to one of the plurality of conflicting data within a first of the sequential clock cycles, and the speculatively prioritized one of the plurality of conflicting data is to be sent to a corresponding one of the plurality of processing cores within a next cycle following the first of the sequential clock cycles.

22. The processor of claim 21, wherein the remainder of the plurality of conflicting data are to be sent to corresponding receiving agents in subsequent clock cycles to the speculatively prioritized one of the plurality of conflicting data.

23. The processor of claim 21, comprising a plurality of routers, each coupled to an equal number of the plurality of processing cores.

24. The processor of claim 23, wherein the router includes four inputs, each coupled to a different one of the plurality of processing cores.

25. The processor of claim 24, wherein the router includes four outputs, each coupled to a different one of the plurality of processing cores.

26. The processor of claim 25, wherein the router includes a fifth input to receive locally injected data.

27. The processor of claim 26, wherein the router includes a fifth output corresponding to the fifth input.

28. The processor of claim 21, wherein a conflict between the conflicting data and one of a plurality of outputs is to be detected within the first of the sequential clock cycles.

* * * * *